United States Patent Office 3,598,624
Patented Aug. 10, 1971

3,598,624
SIMPLIFIED PROCESSING SYSTEM FOR PREPARATION OF PREDISPERSED PIGMENTS
Daniel Kaufman, Grosse Ile, Mich., assignor to Wyandotte Chemicals Corporation, Wyandotte, Mich.
No Drawing. Filed Nov. 19, 1968, Ser. No. 777,145
Int. Cl. C09c 1/02
U.S. Cl. 106—306
3 Claims

ABSTRACT OF THE DISCLOSURE

A process for preparing dry calcium carbonate pigments which may be easily mixed with water to form slurries suitable for paper coating and other applications. This process comprises mixing calcium carbonate filter cake, dispersant, and inert, finely divided solid material which may be easily separated from the calcium carbonate, separating said inert material from the calcium carbonate and drying said calcium carbonate.

---

Inorganic paper coatings are compositions of pigments and adhesives, suspended in water, which are applied to one or both sides of paper by special apparatus to make it more suitable for printing or to improve its decorative quality.

The pigments which can be employed in inorganic coating formulations include, for example, white minerals such as clay, barites, talc and ground limestone; colored pigments such as ultramarine, umber, siennas, ochers and lakes; powdered metals such as tin, zinc, bronze and aluminum; and synthetic pigments such as titanium dioxide, satin white, blanc fixe and precipitated calcium carbonate.

The coating colors, whether for use in the conversion process or in the on-machine coating method, are, in general, thixotropic and tend to set rigidly upon being applied to the surface of the paper. After the coating color has been applied to the paper, the paper is dried in a suitable manner wherein the water from the coating formulation is evaporated. A critical feature of each coating formulation is therefore the ratio of solids to water. Thus, a high solids content is particularly desirable in order to reduce the amount of water which must be evaporated. A reduction in the water content of the coating color is of further significance in that it reduces the cost of the coating step as well as permitting a more rapid coating operation. Although a high solids-low water ratio is particularly advantageous in a paper coating formulation, the formulation must be flowable. The viscosity of the coating color must be low enough so that it can be handled easily with respect to pumping, flow and ease of application onto the paper.

Precipitated calcium carbonate is one of the principal synthetic pigments employed in paper coatings. For the above reasons, there is a significant advantage to a high solids, low viscosity slurry of a calcium carbonate which can be subsequently blended with an adhesive and other suitable adjuncts so as to provide a high solids paper coating having a low viscosity.

Suitable high solids, calcitic calcium carbonate slurries for paper coating purposes generally contain from about 55 to 80% by weight calcium carbonate in an aqueous slurry. In order to have a suitable initial low viscosity, a dispersant in amount of from about 0.3 to 2.0% by weight of the calcium carbonate is generally included in such slurries with the balance of the slurry being substantially all water and impurities in normal amounts.

It has been found that one particular calcitic calcium carbonate is especially suitable for this purpose. This calcium carbonate is characterized in that it is a finely divided, relatively nonaggregated calcium carbonate having an apparent particle size within the range of about 0.05–0.30 micron, as determined by electron micrographs, and can be prepared in accordance with the method set forth in U.S. Pat. No. 2,964,382, G. E. Hall. In accordance with the disclosure of Hall, finely divided, nonaggregated crystals of calcitic calcium carbonate can be prepared by gradually contacting calcium ions with carbonate ions in an aqueous medium at a pH of at least about 8.5, and in the presence of anti-compositing forces of sufficient intensity and magnitude to establish and maintain substantially all of the crystals of calcium carbonate resulting from the contacting step in a completely segregated condition. The resulting calcium carbonate slurry is removed from the reaction zone, filtered, the filter cake washed to essentially salt-free condition, dried, and then crushed. Prior to drying, a typical filter cake generally contains about 40 to 55% by weight solids. In general, the dried calcium carbonate is shipped by the calcium carbonate manufacturer to the paper mill or other user of calcium carbonate who prepares a slurry thereof for paper coating purposes or any use for which a slurry is needed.

In the prior art, high solids-low viscosity slurries of such calcium carbonate which are well suited for these purposes are prepared in accordance with U.S. Pat. No. 3,006,779, Leaf et al.

While the Leaf et al. process is an excellent process for preparing such slurries, it is, as indicated in the patent, necessary to establish in the preparation of such slurry at least one hydraulic attrition zone, and to impart thereby intense turbulence, high kinetic energy, and a velocity of at least about 1500 feet per minute to the slurry in the zone relative to the body of the slurry. This requires a special type of high-speed agitator. While this produces a satisfactory slurry, it is often desirable for the paper mill or other user of the calcium carbonate pigment to be able to use a comparatively slow type of conventional mixing device such as a conventional propeller mixer to prepare the desired slurry without the necessity of imparting such intense turbulence and high kinetic energy with a velocity of at least about 1500 feet per minute to the slurry.

Accordingly, it is a purpose of the instant invention to prepare a calcium carbonate product from which a high solids-low viscosity calcium carbonate slurry may be prepared by a relatively simple mixing step with conventional apparatus such as a propeller mixer.

This and other purposes will be apparent from the following description of the instant invention.

In accordance with the instant invention, a calcium carbonate pigment is prepared by first mixing the filter cake from the filtration of the calcium carbonate prepared by a process such as the process of the Hall patent, U.S. 2,964,382, and which contains about 40 to 55% by weight solids with a dispersant and an inert, finely divided solid material which latter may be easily separated from the calcium carbonate pigment by physical means. The dispersant is provided in an amount of about 0.5 to 2.0% by weight of the calcium carbonate. This mixing step is carried out with enough of the inert, finely divided material and dispersant to provide a slurry containing about 65 to 80% by weight solids in water. Preferably, the mixture comprises from about 40 to 55 weight percent calcium carbonate, 25 to 30 weight percent of the inert, finely divided solid material and dispersant in an amount of about 0.5 to 2.0% by weight of the calcium carbonate.

The time required for mixing the three components set forth above is that which is required to produce a thorough mixture and will vary with the type of agitation employed, size of agitator, type of container, etc., but is easily within the skill of the art. It is merely necessary to mix until thorough mixing is achieved which can be determined by physical appearance. The mixing is preferably carried out at ambient temperature and pressure and, preferably, at a temperature in the range of 15 to 45° C. The slurry is then passed through a suitable screening device to remove the inert solid material, after which it is dried in a conventional dryer such as a rotating cylinder or drum dryer or a spray dryer. A slurry suitable for use in applications such as paper coating, etc., and similar to the slurry prepared in accordance with the Leaf et al., U.S. Pat No. 3,006,779, may then be easily prepared at the paper mill or other desired location by simply adding the desired amount of water to the dried product and mixing wtih a conventional paddle mixer, propeller or other type of conventional, relatively low-speed, low-shear mixer, high-speed, high-shear mixers not being required.

The term "calcium carbonate," as used herein and in the claims, refers to the finely divided, relatively nonaggregated calcium carbonate which is prepared in accordance with the method disclosed by Hall, U.S. Pat. No. 2,964,382, and which has an apparent particle size within the range of about 0.05–0.30 micron as determined by electron micrographs. In a preferred form, at least about one-half of the calcium carbonate particles have an apparent particle size within the range of about 0.10–0.20 micron as determined from electron micrographs.

A dispersant which can be effectively employed in the method of the invention is essentially a three-phase, homogeneous fused product comprising from about 81–88% by weight of soduim phosphate glass having a molar ratio of sodium oxide to phosphorus pentoxide from about 0.9:1 to about 1.5:1, from about 10 to 15% by weight of zinc oxide, and from about 0.5 to 8.0% by weight of a compound selected from the group consisting of the salt and hydroxide of an alkali metal selected from the group consisting of potassium and lithium. The preferred sodium phosphate glass is modified sodium hexametaphosphate which has a molar ratio of sodium oxide to phosphoric pentoxide of 1.1:1. The potassium and lithium salts which can be fused into, or mechanically admixed with, a sodium metaphosphate-zinc oxide glass in order to prepare suitable dispersants include, for example, lithium or potassium metaphosphate or lithium or potassium carbonate. A preferred dispersant contains 83.5% by weight of sodium hexametaphosphate, about 11.5% by weight of zinc oxide and about 5% by weight of potassium metaphosphate. Dispersants containing the above ingredients in the proportions set forth are marketed under the trademark Calgon T and are more fully described in U.S. Pat. No. 2,750,299—G. D. Hansen, Jr.

The inert, finely divided solid material is, as stated before, a material which may be easily separated from the calcium carbonate pigment, generally by simple means such as passing through a sieve. For example, if the inert material is a silica sand, generally the calcium carbonate pigment will pass a 325-mesh sieve while the sand is retained by a 30-mesh sieve. The dispersant material generally forms a coating on the pigment upon drying the mixture which becomes dissolved in the water when the ultimate slurry is prepared.

While clean, white silica sand is preferred as the inert material, the principal criteria are that the material be inert with respect to the other materials in the mixture, that it be finely divided, that it be easily separable from the calcium carbonate pigment, preferably that the particles be large enough so that separation may be accomplished by the use of sieves after the mixture has been dried. Other suitable inert materials include alumina, limestone, silicon carbide, and metal shot.

The following examples further illustrate the method of the invention.

EXAMPLE I

This example illustrates the preparation of dry calcium carbonate pigment in accordance with this invention wherein 156 pounds of calcium carbonate filter cake containing 46% solids and 1.5 pounds of the previously defined Calgon T dispersant were added to a vessel equipped with a Cowles rotating disc dissolver. This is an agitator which employs 8-inch circular impeller discs rotating at high peripheral velocities of the order of about 1500 feet per minute or greater submerged in the slurry which establishes a hydraulic attrition zone in the body of the slurry. The device employs two rotating discs which have a multiplicity of suitably raised veins or depressed grooves forming a symmetrical radial or arcuate pattern of alternate raised and lowered portions around the impeller discs.

After proper mixing, i.e., for about 10 minutes, 180 pounds of white silica sand having a particle size range from 20 to 30 mesh was added to the slurry and the dispersion mixed until a uniform mixture was obtained which required about 30 minutes. The amount of sand added was enough to produce a slurry containing 75% solids. The resultant slurry was filtered through a 28-mesh screen to remove the sand and the remaining slurry dried in a conventional spray dryer.

EXAMPLE II

A dry calcium carbonate pigment was prepared as described in Example I with the exception that 240 pounds of sand was employed which was enough to build the solids content up to 79% rather than 75%.

EXAMPLE III

This example illustrates the preparation of a slurry from the dry calcium carbonate pigment of this invention, wherein the pigment prepared in Example I was added slowly to a 6½" diameter by 7½" high stainless steel mixing pot containing a sufficient amount of water to give a 75% solids slurry with agitation being provided by a conventional low-speed, three-blade propeller mixer 3" in diameter. Following complete addition of the pigment, the resultant slurry was allowed to agitate for ten minutes and then reduced to 70% solids by the addition of water and agitated for an additional five minutes. The viscosity of the 70% calcium carbonate slurry as determined by a Hercules High Shear Viscometer employing bob No. 2 was $4 \times 10^{-5}$ dyne centimeters at 1000 r.p.m. This slurry was made into standard casein or starch-latex coating colors with no difficulty and paper coatings made from colors containing these carbonates had physical properties very similar to the coatings prepared from slurries employing the process of U.S. Pat. No. 3,006,779 when coated by the air knife method.

EXAMPLE IV

A slurry was prepared as described in Example III from the pigment prepared in accordance with Example II. The viscosity of the 70% calcium carbonate slurry as determined by a Hercules High Shear Viscometer employing bob No. 2 was $5 \times 10^{-5}$ dyne centimeters at 1000 r.p.m. This predispersed slurry was made into standard casein or starch-latex coating colors with no difficulty and paper coatings made from colors containing these carbonates had physical properties very similar to the coatings prepared from slurries employing the process of U.S. Pat. No. 3,006,779 when coated by the air knife method.

It is to be distinctly understood that various changes and modifications may be made in the foregoing without departing from the spirit of the invention and scope of the appended claims.

What is claimed is:

1. A process for preparing dry calcium carbonate pigments which may be easily mixed with water to form slurries suitable for paper coating and other applications comprising the steps of mixing calcium carbonate filter cake containing from about 40 to 55% by weight solids, dispersant in an amount of about 0.5 to 2.0% by weight of the calcium carbonate, and inert, finely divided solid material which may be easily separated from the calcium carbonate, the amount of said inert finely divided solid material being sufficient to provide an aqueous mixture containing about 65 to 80% by weight solids, separating said inert material from the calcium carbonate and drying said calcium carbonate, said dispersant being essentially a three-phase, homogeneous fused product comprising from about 81 to 88% by weight of sodium phosphate glass having a molar ratio of sodium oxide to phosphorus pentoxide from about 0.9:1 to about 1.5:1, from about 10 to 15% by weight of zinc oxide, and from about 0.5 to 8.0% by weight of a compound selected from the group consisting of the salt and hydroxide of an alkali metal selected from the group consisting of potassium and lithium.

2. The product produced by the process of claim 1.

3. The process of claim 1 wherein said inert, finely divided solid material is silica sand.

References Cited

UNITED STATES PATENTS

| | | | |
|---|---|---|---|
| 2,540,182 | 2/1951 | Albert | 106—308I |
| 2,581,414 | 1/1952 | Hochberg | 106—309UX |
| 2,816,115 | 12/1957 | Howell | 106—309UX |
| 3,118,782 | 1/1964 | Hoge et al. | 106—306X |
| 2,385,313 | 9/1945 | Thurber et al. | 106—309UX |

JAMES E. POER, Primary Examiner

H. M. S. SNEED, Assistant Examiner

U.S. Cl. X.R.

106—308B; 162—181; 241—16